(12) United States Patent  (10) Patent No.: US 6,488,177 B2
Arciniegas  (45) Date of Patent: Dec. 3, 2002

(54) PLASTIC LID WITH FUSED POUR SPOUT AND A METHOD AND APPARATUS FOR MAKING SAME

(76) Inventor: Alfonso N. Arciniegas, 7807 Beckwith Rd., Morton Grove, IL (US) 60053

( * ) Notice: Subject to any disclaimer, the term of this patent is extended or adjusted under 35 U.S.C. 154(b) by 0 days.

(21) Appl. No.: 10/034,426

(22) Filed: Dec. 27, 2001

(65) Prior Publication Data

US 2002/0070237 A1 Jun. 13, 2002

Related U.S. Application Data

(62) Division of application No. 09/304,391, filed on May 4, 1999, now Pat. No. 6,382,468.

(51) Int. Cl.$^7$ .................................................. B67B 7/00
(52) U.S. Cl. ....................... 222/1; 222/153.06; 222/530; 222/541.9
(58) Field of Search ................................ 222/530, 529, 222/538, 541.6, 541.9, 153.06, 1

(56) References Cited

U.S. PATENT DOCUMENTS

| | | | | |
|---|---|---|---|---|
| 4,111,331 A | * | 9/1978 | Summers | 215/274 |
| 5,221,028 A | * | 6/1993 | Dwinell | 222/529 |
| 5,256,225 A | * | 10/1993 | Dwinell | 156/216 |
| 5,577,643 A | * | 11/1996 | Stolz | 222/529 |
| 5,897,823 A | * | 4/1999 | Davis et al. | 264/266 |
| 5,913,460 A | * | 6/1999 | Arciniegas | 222/529 |
| 5,967,376 A | * | 10/1999 | McLelland et al. | 222/153.06 |

* cited by examiner

Primary Examiner—Henry C. Yuen
Assistant Examiner—M A Cartagena (57) ABSTRACT

A method and apparatus for fusing a pour spout to the surrounding surface of a lid or container during the molding process. During molding the hot molten plastic of the lid or container contacts a relatively thick rim portion at the bottom of the pour spout to meet the thick rim portion and create fusing during the cooling of the mold. The pour spout has a flexible section to permit a portion of the fused pour spout to be moved between collapsed and extended positions.

12 Claims, 14 Drawing Sheets

PLASTIC LID WITH FUSED POUR SPOUT AND A METHOD AND APPARATUS FOR MAKING SAME

This application is a divisional of my application Ser. No. 09/304,391 filed May 4, 1999, now U.S. Pat. No. 6,332,468.

BACKGROUND OF THE INVENTION

The present invention relates to a fused combination of a plastic lid and a pour spout. While the invention may have wider application, it will be described here in conjunction with a plastic lid and a flexible pour spout fused to the lid which can be collapsed to a position relatively flat with the lid and can be pulled out to an extended position when it is desired to pour liquid from a bucket which is closed on the top by the lid. A preferred embodiment of the invention will be described relative to a combination of a plastic lid intended to close a plastic bucket, and a plastic pour spout fused to the lid and movable between a collapsed position and an extended position.

Such a pour spout cannot be made of a material which has the same thickness as the lid. Such a pour spout must have a relatively thin spout section to permit it to be pressed into a generally flat or collapsed position when not in use, and to be pulled out to an extended position when the spout is to be used for pouring from a bucket on which the lid is attached. In contrast, the plastic lid material must be much more stiff than the pour spout.

It has been known heretofore to manufacture a pour spout and attached to a molded lid. Thus, the lid and pour spout are molded separately, and then attachment operation is carried out to attach the pour spout to the lid. Where a pour spout is to be use, the lid most be molded with a fitting to which pour spout can be attached. Such fitting will normally include a solid portion which can be punched out to create a hole where the pour spout attaches. The pour spouts have the own screw cap or the like foreclose. If no pour spout is utilized, the lid can be function as a normal closure of an open top bucket.

Known pour spout comprise relatively soft, thin plastic in the spout area combined with a relatively rigid base portion which attaches to the lid fitting. Such base portion may be made of metal, or relatively rigid plastic. Known pour spout also has screw-on lid or cap, so the spout can be opened and closed. In some cases, the spout will snap onto a fitting portion on the lid, while in other cases the spout may screw on to the lid fitting. In all such cases, the pour spout is attached to the lid after the lid has been molded, and such pour spouts are relatively expensive.

The known pour spout have significant disadvantages. As noted above they are relatively expensive, and of course an attachment operation is required after the lid is molded. Beyond that, plastic bucket and lid combinations are often required to be subjected to drop tests to assure that filled bucket can withstand a given drop without the lid disengaging or any of the contents being lost. The various known spouts as described above which snap or screw on to a lid fitting have not perform well when subjected to a required drop tests. In addition, there a theft problem because the relatively expensive pour spout can easily can be removed from lid fitting.

The present invention involves a novel method of fusing a pour spout to a lid during the molding of the lid. Thus, the pour spout is molded fits and is placed in a special steel mold inserts which are positioned in the lid mold, when the lid is molded, the previously molded pour spout is molded integral or fused to the lid so that no subsequent attachment operation is required.

One of many advantages of the invention is that the molded pour spout is relatively inexpensive due to its simplicity. The pour spout comprises the usual thin and flexible spout portion, and a relatively thick flange or rim at the bottom. During the molding of the lid, the molten plastic is permitted to surround a relatively thick flange or rim of the pour spout to fuse the base of the pour spout to the lid. At the same time, the mold inserts serve to prevent the molten plastic from engaging the think spout portion of the pour spout which would be destroyed if contacted by the molten plastic. The pour spout used in the present invention has the usual screw-on cap or the like for opening and closing the spout, and it is collapsible to a flat position as in known in the art.

The pour spout used in the present invention is quite simple and inexpensive compared to the known pour spout which are attached to a lid fitting after the lid has been molded. As described above e, the pour spout essentially comprises only the usual flexible spout portion with a cap, and a relatively thick rim or flange at the bottom which is fused to the lid during the molding of the lid. Such a pour spout could not be fused to a lid during the molding of the lid without the special mold inserts which comprise an element of the present invention, because the thin portion of the spout would de destroyed if it were contacted by the molted plastic which form the lid. Another advantage of the present invention is that fusing of the pour spout and lid during the molding of the lid creates a bond between the pour spout and lid which is especially strong so as to provide significantly improved drop test results. Moreover, the theft problem is eliminated since the pour spout is not removable.

The mold inserts of the present invention comprise a pair of rigid inserts which may be steel, which fit into the respective halves of a lid mold. In accordance with the preferred embodiment to be described herein, the mold inserts are round, and approximately four inches in diameter. The mold inserts open an close with the two halves of a lid mold, and a molded pour spout is positioned in one of the inserts and held tightly therein when the lid mold and mold inserts are closed. The inserts are designed to that the hot plastic will flow around a relatively rigid base portion of the pour spout to fuse it to the lid being molded, while the inserts prevent the molted plastic from engaging the soft, flexible portion of the previously molded pour spout. The mold inserts are also water cooled to enable them to protect the flexible portion of the pour spout.

There is one prior art technique which bears a superficial resemblance to the present invention. It is known to mold a plastic lid, and to connect a molded pour spout to such a lid by fusing or welding the pour spout to a fitting formed on the lid. Such a method involves attaching the pour spout to a lid after the lid is molded, which is entirely different from the present invention. Beyond that, the final product is very different because the known fusing technique only affects fusing of the spout to the lid at the very bottom surface of the spout. In contrast, the final product of the present invention comprises a spout and lid combination where the spout is fused to the lid around many different surfaces all the way around a rim flange of the spout and not just around a bottom surface. Such extensive fusing of the pour spout to the lid can only be achieved using the present invention where the spout is fused to the lid during the molding of the lid.

One of the important features of the present invention is the use of a rigid inserts to pinch against the thin portion of the previously molded pour spout to create seal which prevents the flow of molten plastic past the seal. The lid inserts when closed create steel against steel contact, but the mold inserts are designed so that when closed they pinch against the thin section of the molded pour spout without engaging so hard that they destroy the spout.

In the foregoing manner, the pair of mold inserts, which hold the molded pour spout, pinch the thin portion of the pour spout to seal off and protect the thin pour spout section from being contacted by molten plastic while at the same time the molten plastic is permitted to flow around a relatively thick rim or flange portion at the bottom of the pour spout. The relatively thick rim or flange portion of the pour spout, which is thick enough not to be damaged by the molten plastic, is thereby fused to the lid during the molding of the lid. The hot plastic melts the relatively thick rim portion at the bottom of the pour spout to fuse the same with the adjacent portion of the lid as the lid is mold.

During the molding of the lid, the mold inserts are designed to be in closed proximity to the thin section of the previously molded pour spout so that, in addition to sealing off the that thin section from the molten plastic, the inserts, which are water cooled, serve to cool the thin section of the pour spout to avoid damage which could otherwise be caused by conduction of heat from the relatively thick rim section of the pour spout which is exposed to the molten plastic. It is known in the art to water cool mold inserts, but such inserts have not previously been used for a purpose as in the present invention.

Based on the foregoing description, the pair of mold inserts serve two purposes. First, when the lid mold halves are closed, the closed mold inserts pinch against a thin section of a molded pour spout to seal the same off from contact with the molted plastic, and in addition the water cooled inserts cool the thin section of the spout to protect it against heat conducted from the rim portion of the spout which is exposed to the molted plastic. The mold inserts preferably fit close against the thin section of the pour spout to cool the later.

The foregoing an other objects and advantaged of my invention will be apparent from the following description of a preferred, embodiment thereof, taken in conjunction with the accompanying drawings.

In my previous described embodiment of a plastic lid with a fused pouring spout, a flexible plastic pouring spout, a type of liquid dispensing closure previously molded with a flexible plastic material and commonly found on industrial size containers, was incorporated to the lid closure by fusion to its base during the process of molding.

While the above describe flexible spout fusion concept is without question the most economical and positive process for the industry of liquid dispensing containers, in the manufacturing production of the lid closures with the spout it is necessary to have an additional manufacturing operation to install the screw cap to the spout. The spout cap is also widely used for resealing the container once it is open and also for lifting the spout from its nested position.

This latter embodiment is directed to fusion of a flexible pouring spout assembly, or any other pouring device assembly, where the spout base and the spout threaded cap, or the pouring device and its cap assembly are fused into an opening in the plastic lid closure, the plastic container closure or the plastic closure. The result is a plastic container or the like for containing liquids, and the provision of a 100% degree of tamper proof protection through fusion of the base of the spout to the plastic closure or a plastic lid closure and the fusion of the spout cap to the same plastic closure or a plastic lid closure. The fusion of the pouring spout cap to the closure is accomplished by fusion of several frangible connecting webs to the periphery of the cap. The frangible webs normally have to be broken to remove the cap offering a tamper proof protection.

Now, in order to acquaint those skilled in the art with the manner of making and using my invention, I shall describe, in conjunction with the accompanying drawings, a preferred embodiment of my invention.

DETAILED DESCRIPTION OF THE INVENTION

Figure 4:
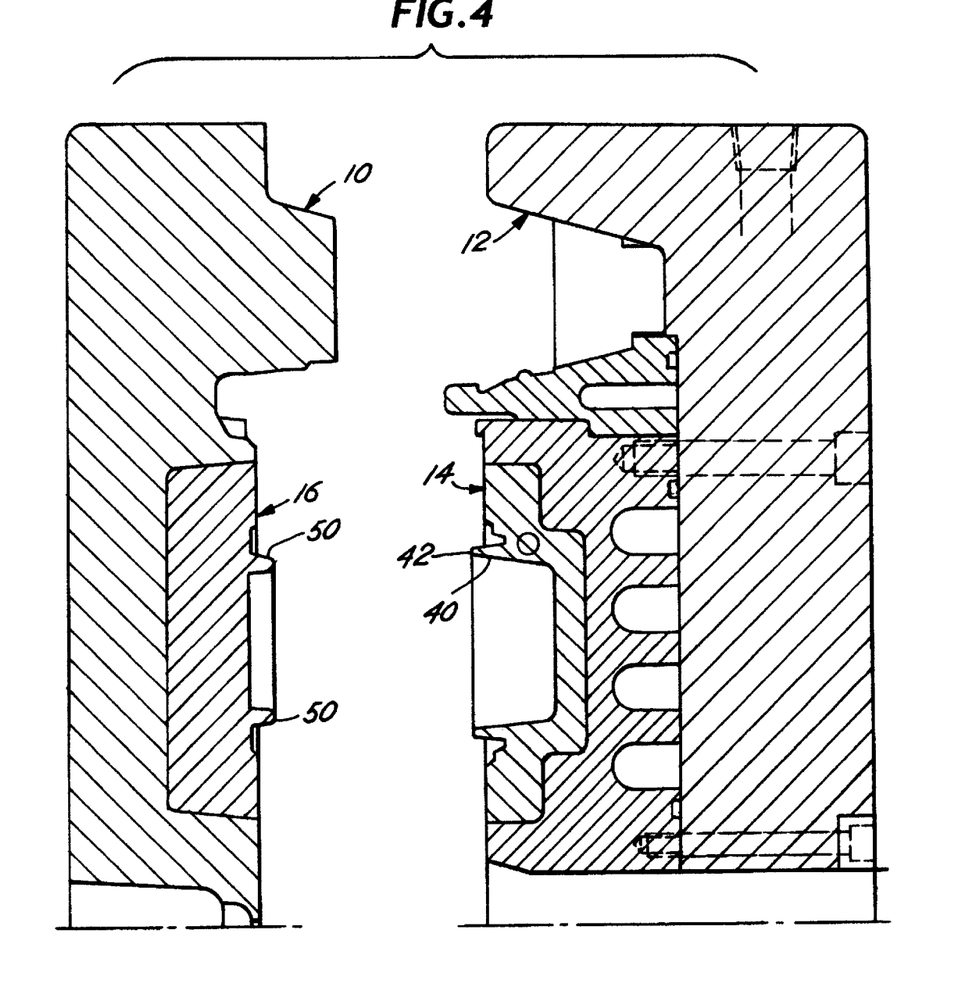
FIG. 4 is a fragmentary view, partly in section, showing a pair of lid mold half section in a mold-open position, there being shown a pair of mold inserts positioned in respective ones of the lid molds.
Figure 5:
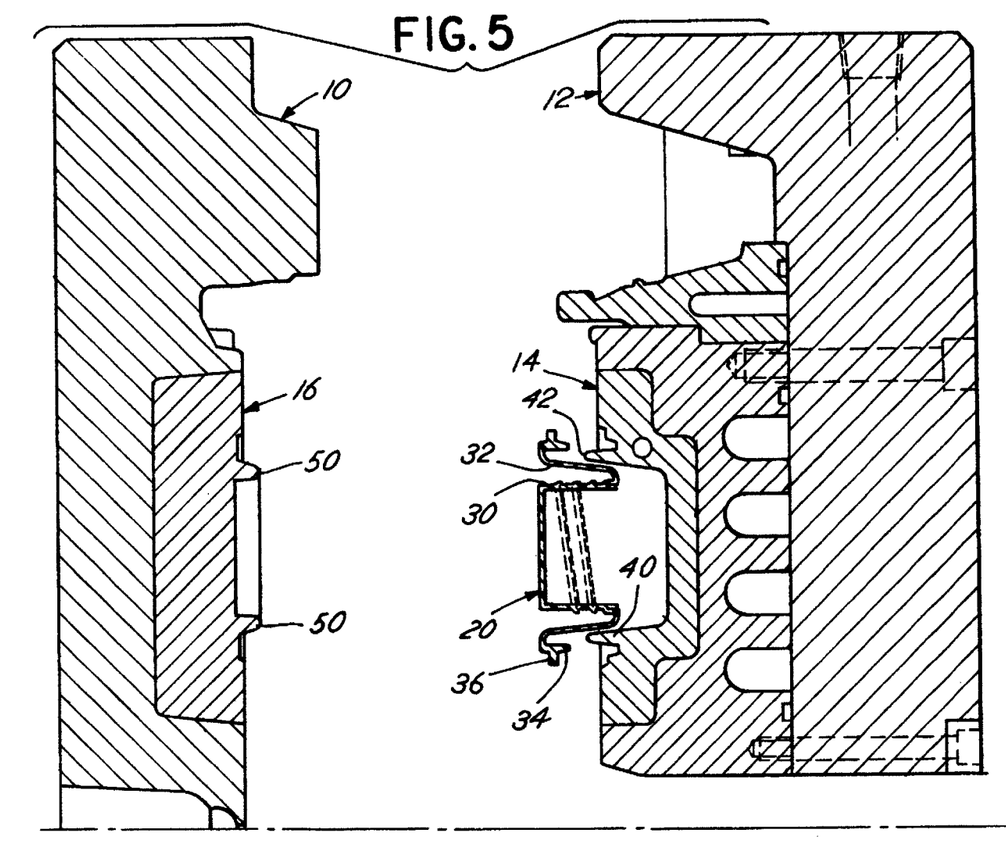
FIG. 5 is a view similar to FIG. 4 showing a previously molded pour spout partially inserted into one of the mold inserts.
Figure 5A:
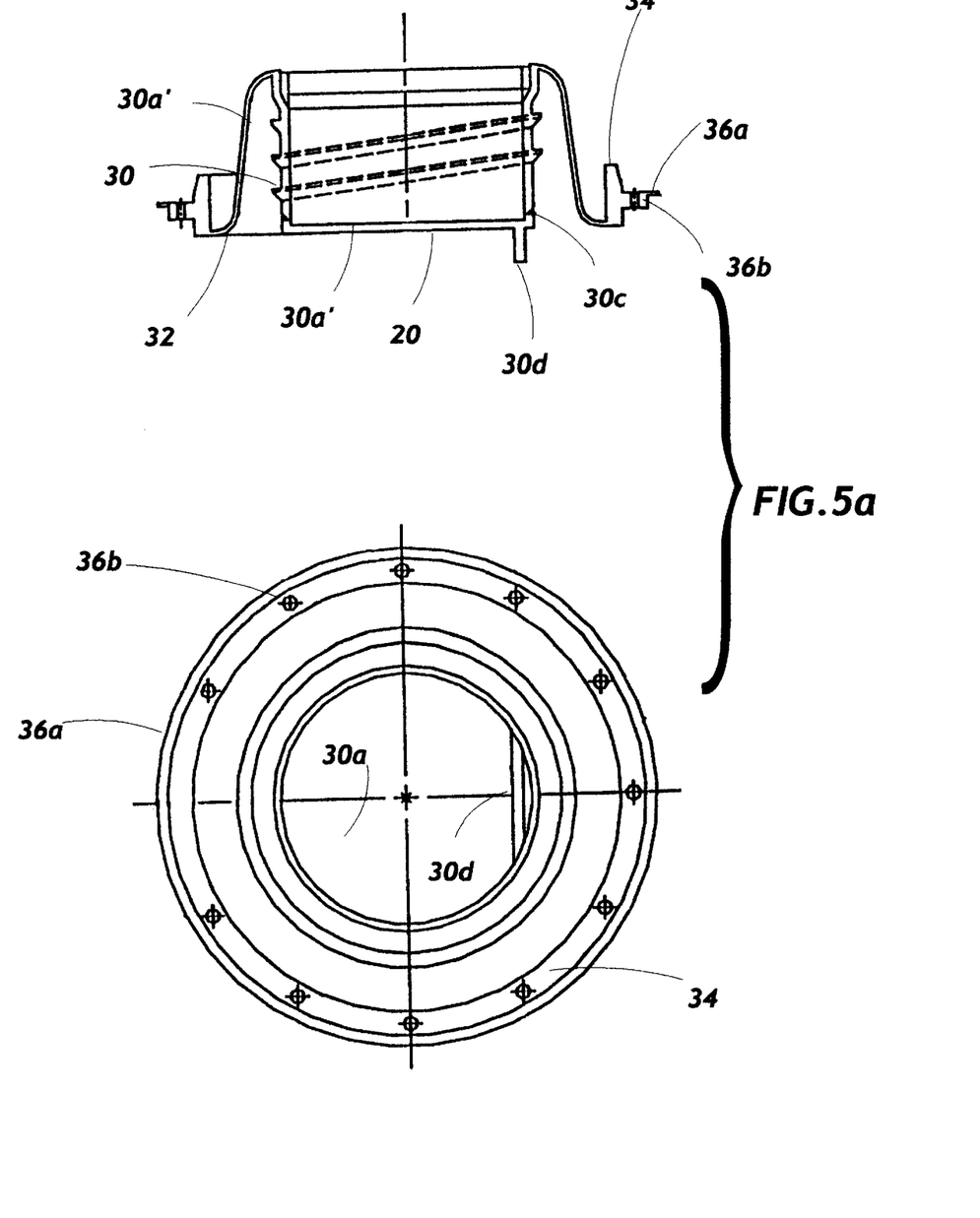
Figure 6:
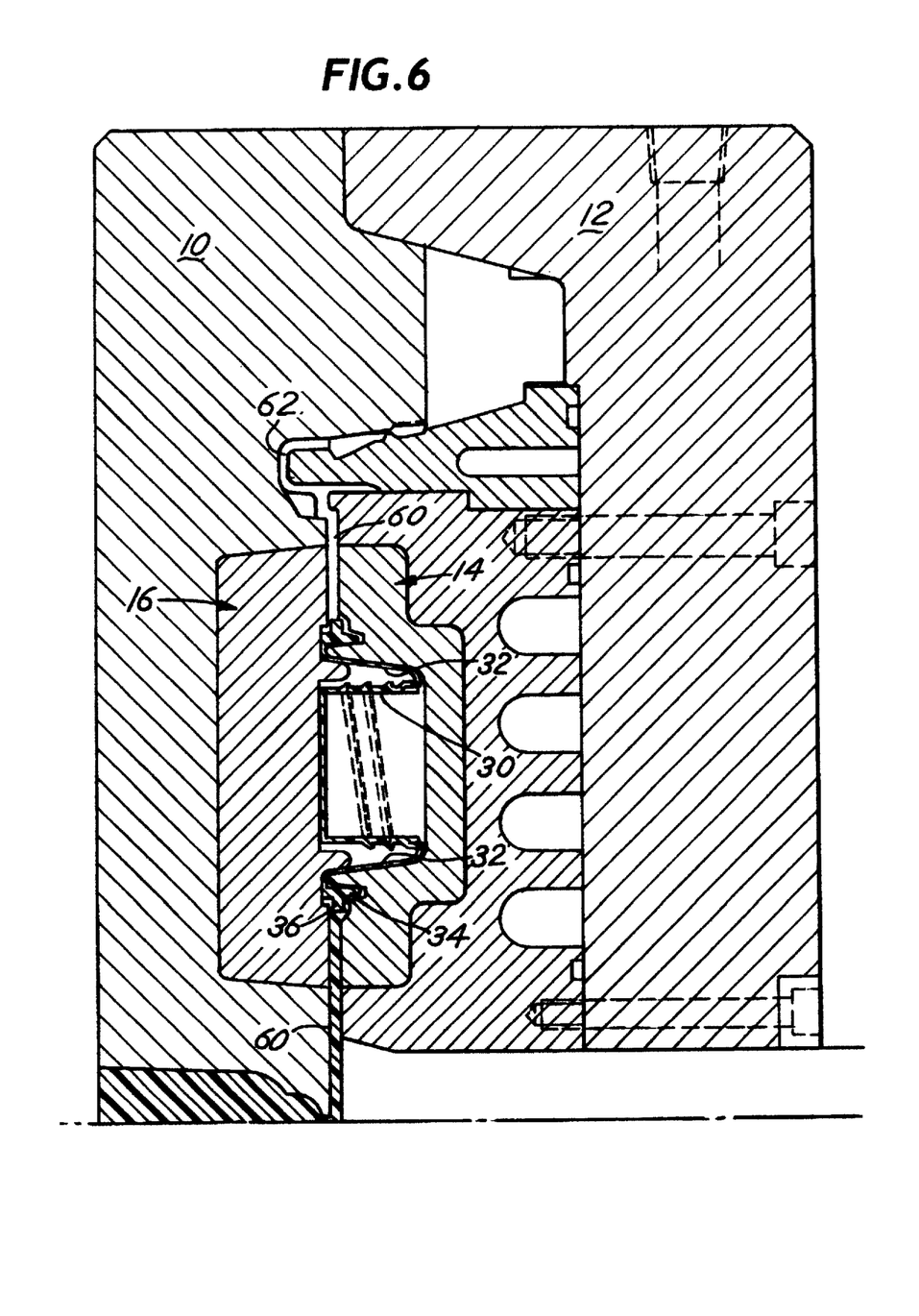
FIG. 6 is a view showing the molds of FIG. 5 in a mold-closed position during a plastic injection cycle.

Reference is made to FIGS. 4, 5 and 6. FIG. 4 shows lid mold half sections, a cavity side of the lid mold being shown at 10 and the core side being shown at 12. Such molds are normally made of steel, and in the preferred embodiment being described, mold inserts are also made of steel. FIG. 4 shows in cross-sections of a cavity side mold inserts 14 and a core side mold inserts 16.

Figure 8:
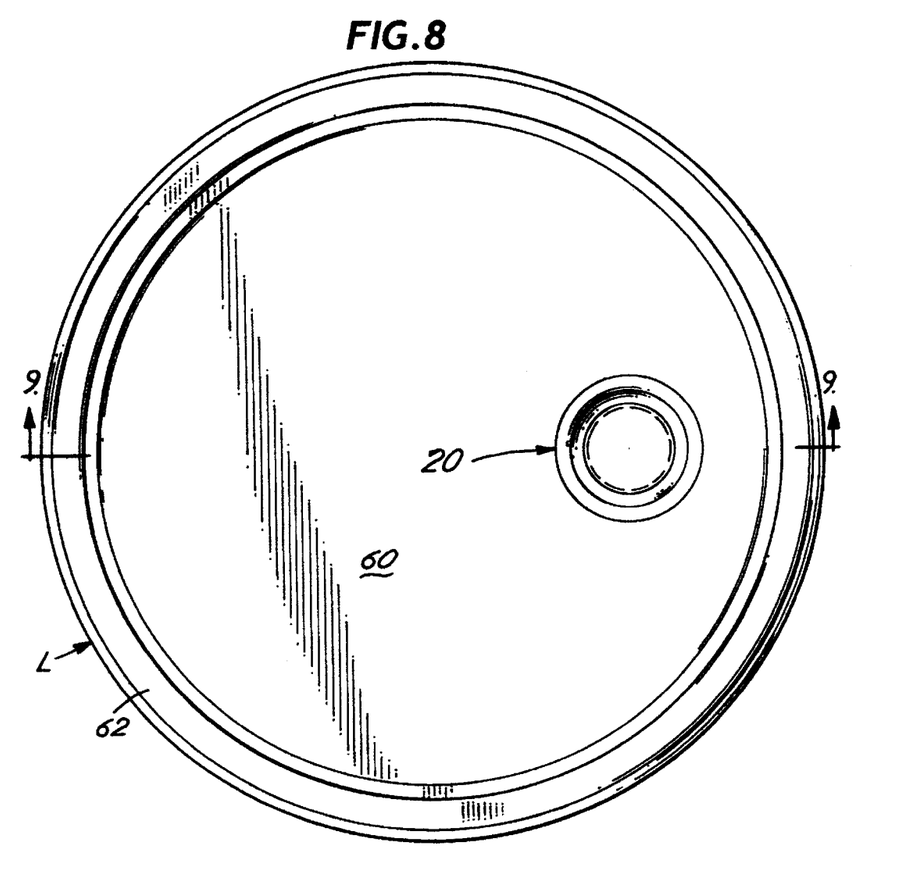
FIG. 8 is a top plan view of a molded lid having a previously molded pour spout which was fused to the lid during the molding of the lid in accordance with the present invention.
Figure 9:
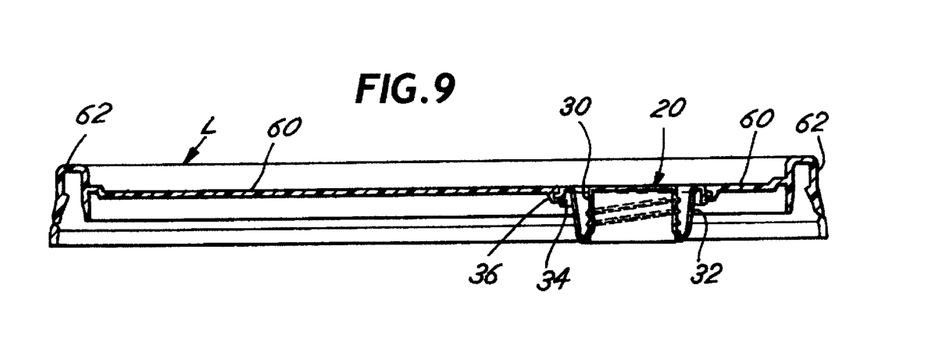
FIG. 9 is a vertical section taken along the line A—A of FIG. 8 showing the molded lid and fused pour spout, a cap for the pour spout not being shown.

FIG. 8 is a top plan view of a molded lid and a fused pour spout 20, the lid and spout being shown in vertical section in FIG. 9.

In the preferred embodiment being described. The pour spout 20 is located radically out from the center of the lid on the section line A—A as shown in FIG. 8. During the molding of the lid, the molted plastic is injected at the center of the like mold and flows radically outwardly to the outer periphery of the lid mold. As the plastic flows radically outwardly the previously molded pour spout will be fused to the lid when the plastic reaches the location the pour spout as best shown in FIGS. 8 and 9.

Referring again to FIG. 4, the drawing shows the lid mold half sections in the open position with the mold inserts positioned in the respective lid molds in preparation for the molding of a lid. FIG. 5 is similar to FIG. 4 but it further shows the previously molded pour spout 20 being inserted into the cavity side mold insert 14. As shown in FIG. 5, the previously molded pour spout has an outer threaded neck portion 30 into threads 30a' to receive a threaded cap (not shown) for covering the spout, a soft, thin section 32, an annular rim 34, and an annular flange 36, the flange 36 is provided with a tip or thin end section 36a' to ensure fusion of part 36 with the molded lid wall or part 60 and is provided with a bore or hole means 36b to ensure further fusion between part 36 and the part 60. To open the spout 20, the top flat plate thin portion 30a of the spout neck portion 30 is attached to the cylindrical wall of the threaded portion 30b is provided at its end with a cylindrical thinner wall section 30c to allow removal of the plate portion 30a. Further there is provided a graspable tab 30d at the edge of the plate portion 30a. When the tab 30d is pulled away from the neck portion 30 the thin portion 30c is torn away from the cylindrical portion 30b allowing removal of the top portion 30a and exposing the inner contents of container which can now be poured out of the container or can.

As will be described more fully later therein, it is the relatively rim 34 and flange 36 which are contacted by molted plastic during the molding of a lid and are fused to the lid, caused by melting a fusing between the hot plastic and the cold plastic of the pour spout rim and flange. The design of the rim 34 and flange 36 may vary, the important point being that a relatively thick plastic rim or the like is required at the "bottom" of the previously molded pour spout where the spout is fused to the lid. The remained of the pour spout, especially including the very thin spout portion 32, is protected from contact with molted plastic in accordance with the present invention. FIG. 5 shows the pour spout 20 in its collapsed position which is the position of the pour spout during the molding of the lid. As is known in the art, the neck section 30 may be pulled out to an extended position fro purposes of pouring liquid from a container.

Figure 3A:
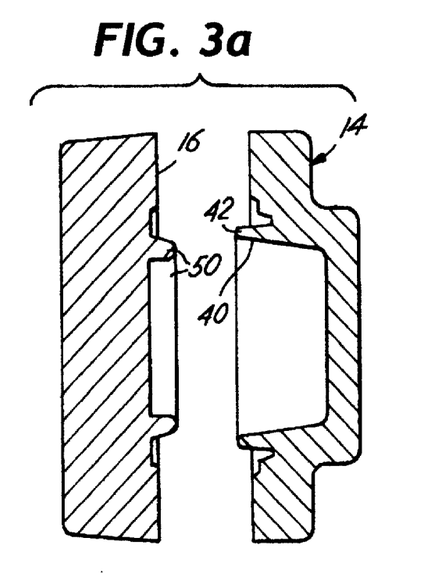
FIG. 3a is a sectional view showing a pair of mold inserts in a mold-open position.
Figure 3B:
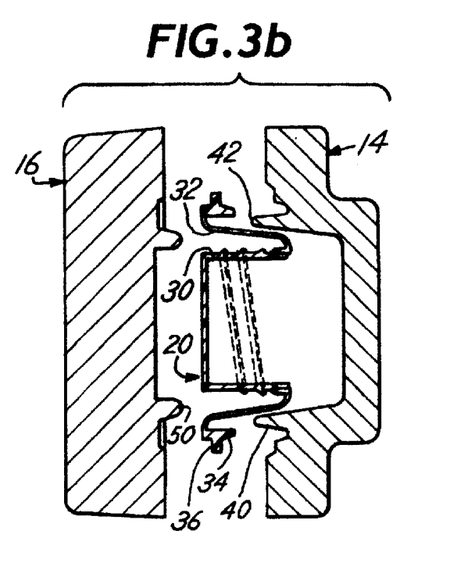
FIG. 3b is a view similar to FIG. 3a showing a previously molded pour spout being inserted into a cavity side, steel insert.
Figure 3C:
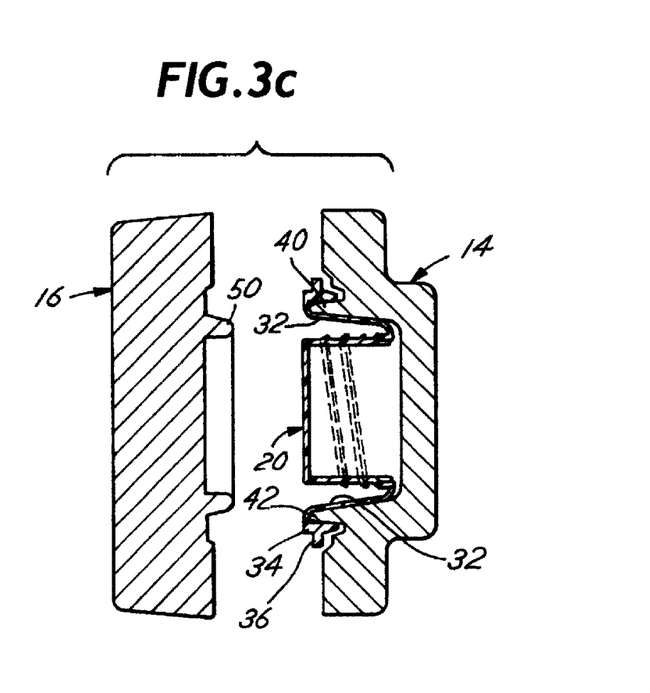
FIG. 3c is a view similar to FIG. 3b showing the pour spout fully inserted onto the mold inset in a position suitable for closing of the mold.

Reference is now made to FIGS. 3a through 3e. FIG. 3a shows the mold inserts 14 and 16 in a mold-open position. FIG. 3b show the mold inserts in a open position with the molded pour spout being inserted into the cavity side insert 14. FIG. 3c shows the pour spout 20 fully inserted into the cavity side inset 14 in preparation for a lid molding cycle. The cavity side insert 14 includes an annular projecting rim 40 having a rounded outer annular portion 42. As shown in FIGS. 3b and 3c, the projecting annular rim 40 fits radially inwardly of the annular rim 34 on the molded pour spout, and the rounded out annular portion 42, of the insert engages against the thin spout section 32 in the area where the thin spout section connects with the rim 34. As shown FIG. 3c, the relatively thick rim 34 and flange 36 on the molded pour spout are positioned in an annular space in the mold insert 14 radially outwardly of the annular rim 40.

Figure 3D:
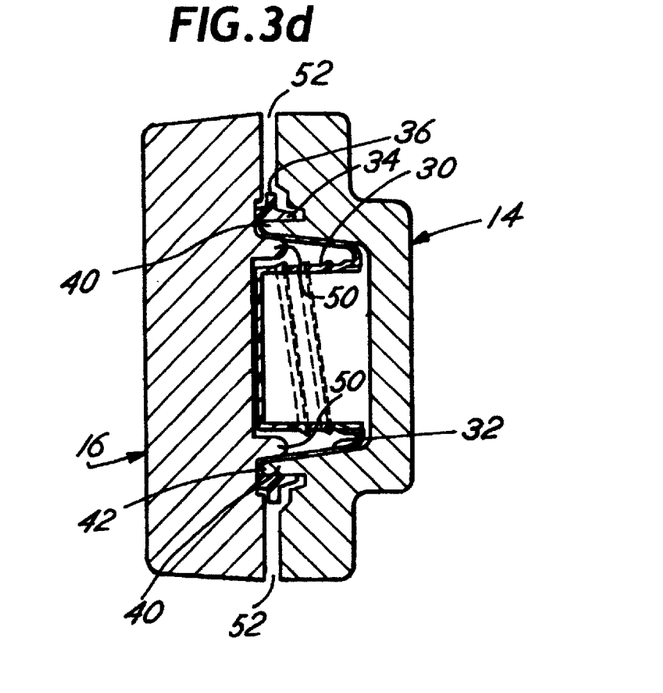
FIG. 3d shows the mold inserts in a closed position where a relatively thick rim portion at the bottom of the pour spout will be exposed to molted plastic during the molding of a lid, while opposed portions of mold inserts pinch against a thin portion of the pour spout adjacent the relatively thick rim portion to seal off the thin portion of the spout from exposure to molted plastic.

FIG. 3d shows the mold inserts 14 and 16 in a mold-closed position as during plastic injection. The core side mold insert 16 has a projecting annular rim 50 which in the close position fits closely inside the rim 40 on the insert 14, leaving just enough space to accommodate the thin wall of pour spout section 32. FIG. 3d also illustrates how in the mold-closed position the out portion 42 of the projection annular rim 40 on insert 14 engages against the mold insert 16 by an amount sufficient to pinch the thin spout wall 32 between the insert 16 and the outer portion 42 of projecting rim 40.

As described earlier, in the mold-close position, the lid mold halves shown at 10 and 12 in FIG. 5 will engage steel to steel, but the mold inserts 14 and 16 engage by an amount sufficient to pinch the thin spout wall 32 to create a seal, but not so much as to damage that thin wall. The purpose of the pinching can be seen in FIG. 3d. The annular space shown at 52 represent the space in which molted plastic will flow between the mold inserts 14 and 16 during lid molding operation. It can be seen from FIG. 3d that as molted plastic flows into annular space 52, it will fill the space 52 and will also flow around the spout rim 34 and spout flange 36. The plastic in space 52 will form section of the lid wall and the molted plastic surrounding spout rim 34 and spout flange 36 will partially melt the latter and use it to fuse with the lid wall which surrounds the spout rim 34 and flange 36. Thus, as the lid is molded, the lid wall surrounding pour spout 20 is fused to the rim and flange portions of the pour spout.

Figure 3E:
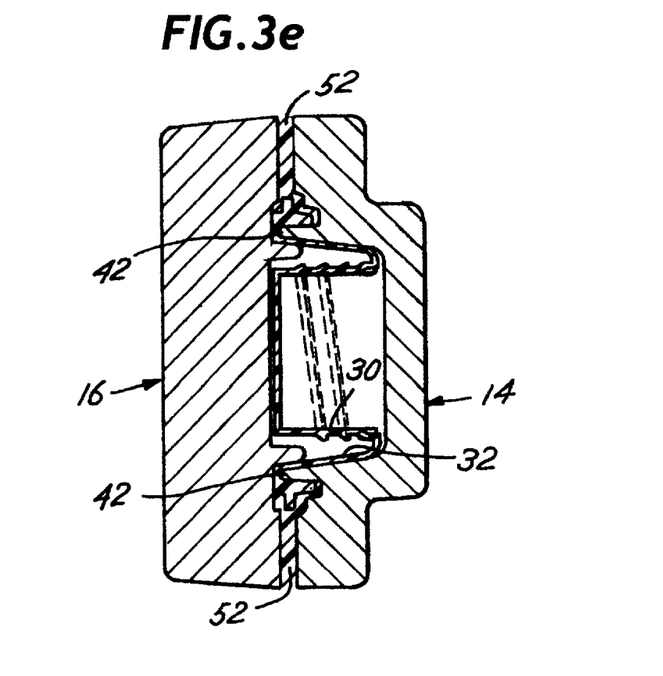
FIG. 3e show the mold inserts during injection of plastic fusing the molding of plastic lid.

FIG. 3e represents a showing of the molted plastic filling the open spaces created by the mold and mold inserts in their closed position of FIG. 3d. FIGS. 3d and 3e further show how the pinching of the thin walled section 32 of the pour spout adjacent its rim 34 creates an annular seal so the molted plastic flowing radially into the annular opening 52 is prevented from flowing past the outer portion 42 of projecting rim 40 of inset 14 and is thereby prevented from contacting the thin wall section 32 of the pour spout. As described earlier the inserts 14 and 16 are preferably water cooled so they will cool the thin wall 32 of the pour spout and protect it from heat conducted from the rim portion 34 of the pour spout 20.

Figure 7:
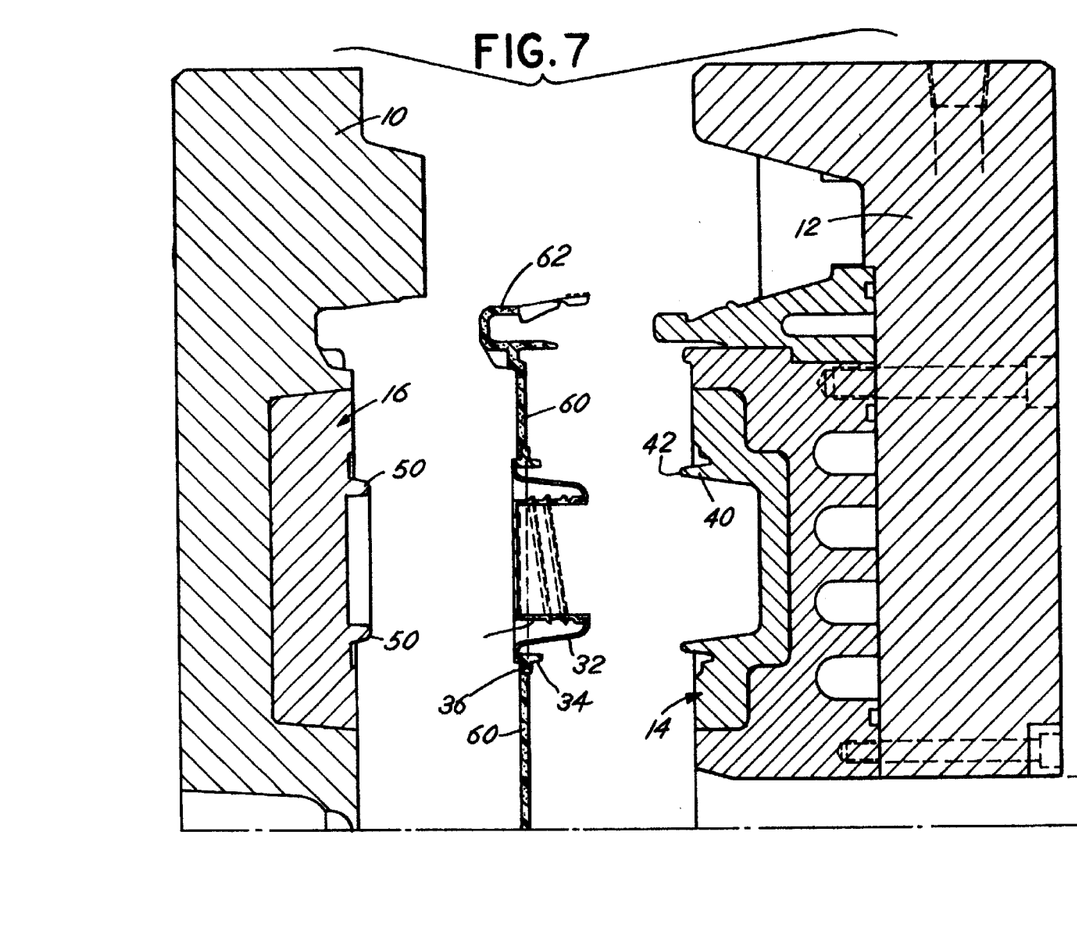
FIG. 7 is a view showing the molds of FIG. 6 in a mold-open position with a plastic lid ejected therefrom, the lid being fused with the previously molded pour spout.

FIGS. 6 and 7 further illustrate the method and mold inserts of the present invention. FIG. 6 shows the lid mold half sections 10 and 12 in their closed position, and thus they illustrate a mold cavity which defines one half of the lid, including the mold inserts 14 and 16 which control the fusing of the lid wall to the annular rim 34 and flange 36 of the pour spout while protecting the spout thin-walled section 32 so it is not engaged by the molted plastic. FIG. 6 show w a molded lid wall 60 including an outer peripheral lid rim portion 62, and as previously described the lid wall 60 surrounds the pour spout 20 and is fused to the annular spout rim 34 and flange 36 during the molding of the lid FIG. 7 shows the lid mold halves 10 and 12 in an open position with the molded lid and fused pour spout combination eject from the mold.

FIGS. 8 and 9 further illustrate the molded lid L having a rim portion 62 and flat wall portion 60. FIG. 9 comprises a full section of the lid L showing the location of the fussed pour spout 20. Of course, the location of pour spout 20 may vary. The lid shown in FIG. 9 is of a known design, and the rim portion 62 is configured to fit down tightly over the open upper end of a plastic bucket. A threaded cap (not shown) fits one the upper end of the threaded neck portion 30 of the pour spout.

The pour spout 20 is shown in its collapsed or flat position in FIG. 9, and when it is desired to use the same for pouring, it is pulled to an extended position which is permitted due to the soft, flexible section 32 as is known in the art.

Figure 1:
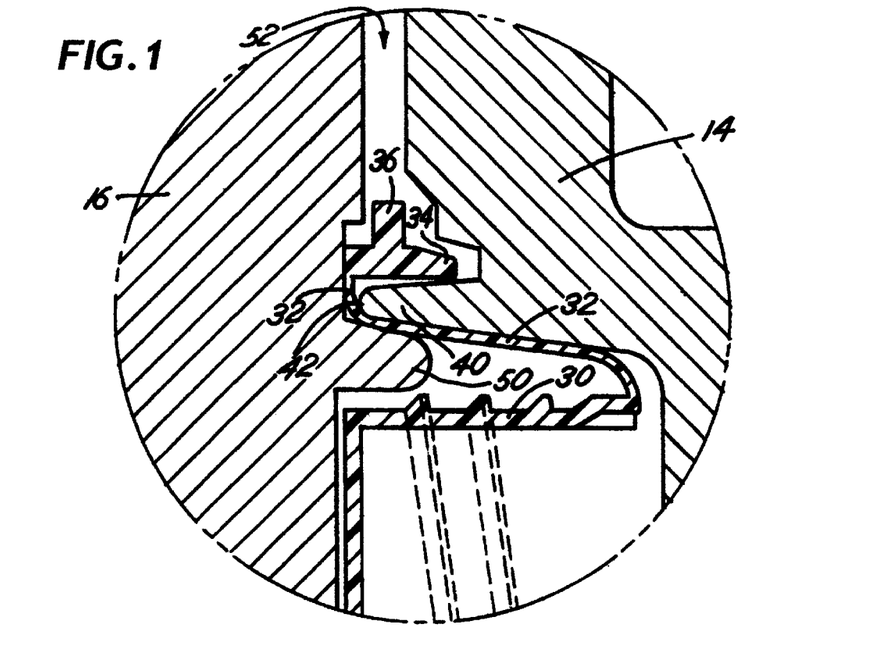
FIG. 1 is fragmentary, sectional view showing a pair of mold inserts with a previously molded pour spout positioned there between, the mold inserts being shown approaching but not yet in a fully closed position.
Figure 2:
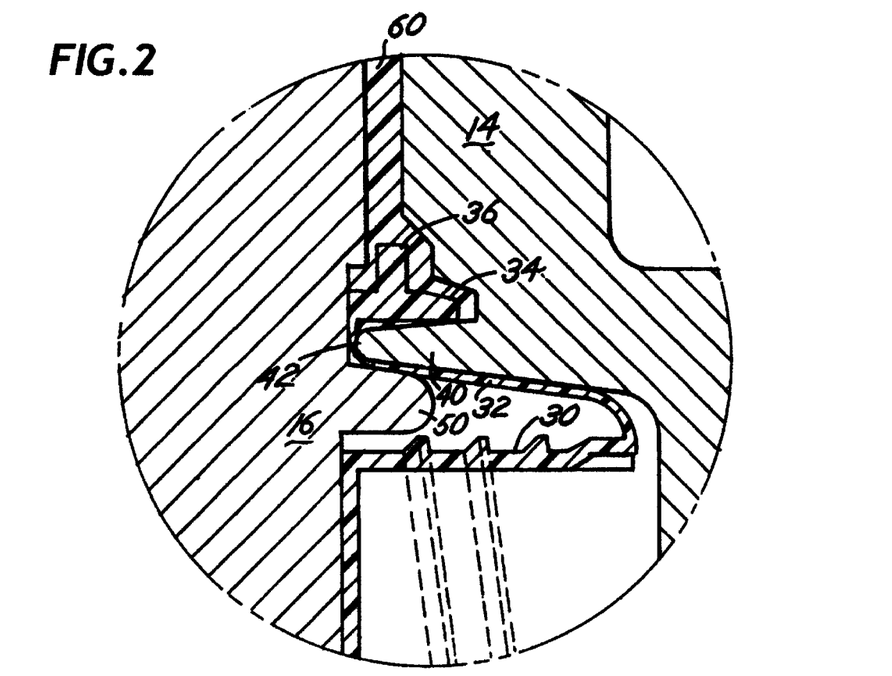
FIG. 2 is a fragmentary, sectional view of the type shown in FIG. 1, but with the mold inserts fully closed in the position they are in during the molding of a lid.

FIGS. 1 and 2 are enlarged, fragmentary section views which further illustrate the cooperation between the mold inserts and the previously molded pour spout to permit fusing of the lid wall to an annular rim and flange of the pour spout while protecting the thin wall section 32 of the pour spout 20 against contact by molted plastic. FIG. 1 shows the mold inserts 14 and 16 is an almost but not fully closed position, while FIG. 2 shows the mold inserts in a fully closed position. As shown in FIG. 2 and the other drawings showing the mold inserts 14 and 16 fully closed, it should be understood that the pinching of the thin spout wall section 32 between the outer annular portion 42 of the inset 14 and the opposing wall of the insert 16 occurs at two different annular areas. One such annular area is at the extreme outer end of the annular portion 42 of insert 14, and the other are is slightly around the corner of 42 and below the projection 42 viewed in FIG. 2. Thus, two redundant annular pinching areas are created.

As previously described, the molded pour spout used the present invention must have a relatively thick or rigid section at its lower end for fusing to the wall of the lid. However such relatively thick spout section need not take the form of the rim 34 and flange 36 described in the foregoing preferred embodiment.

Figure 10:
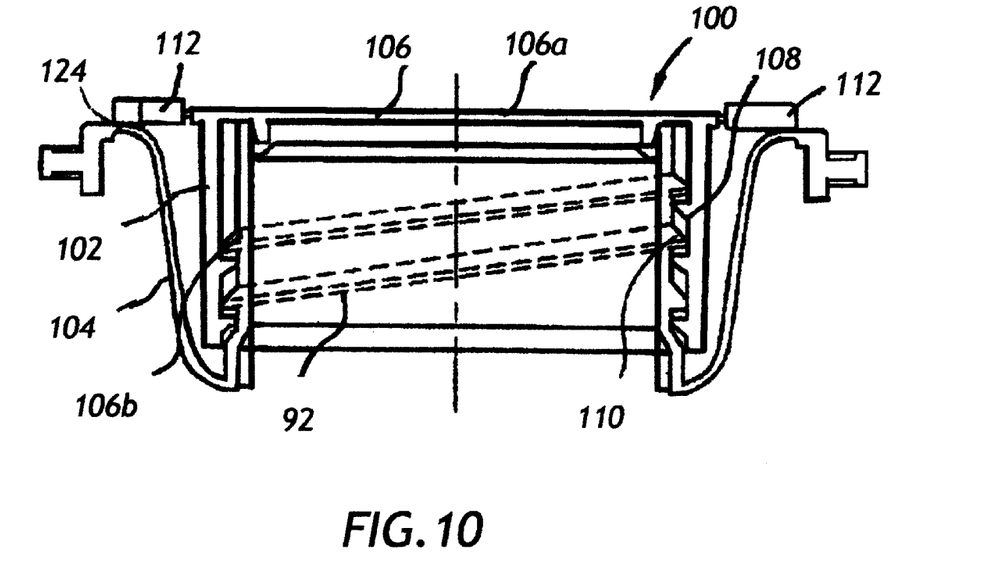
FIG. 10 is a side elevational view, with parts in section, of a flexible spout having a threaded cap in retractable positions.
Figure 11:
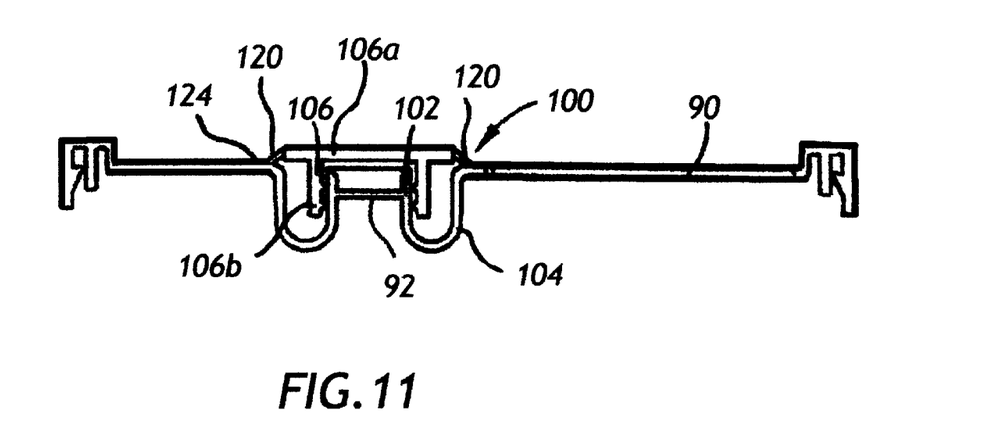
FIG. 11 is a side elevational view, with parts in section, showing the cap being fused to the lid closure of the container through a plurality of frangible webs.
Figure 12:
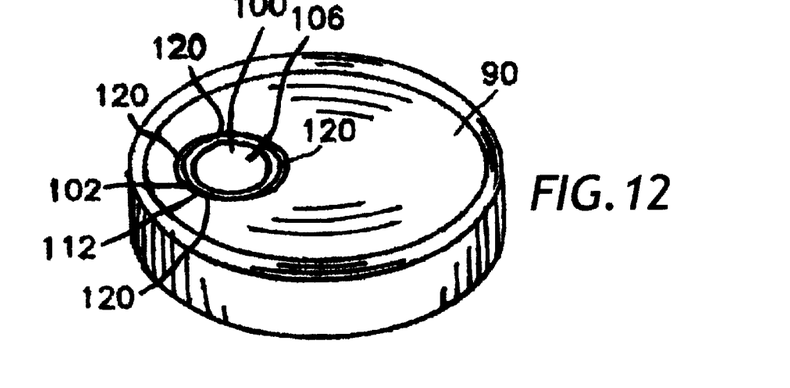
FIG. 12 is a top perspective view of the lid closure showing the plurality of frangible webs.

Referring now to FIGS. 10–14, there is illustrated an embodiment of the tamper proof lid closure invention for use with a plastic container (not shown). In FIG. 10 a typical flexible spout assembly 100 is shown having a spout 102 and spout base 104 made of a flexible plastic whereby the spout 102 is in its retracted position. Although the tamper proof flexible spout assembly 100 is shown in connection with an opening of a lid closure 90, it is within the scope of the invention to use the teaching of the invention with pourable openings anywhere on the container. A cap 106 having upper lid 106a and a lower base 106b is formed with a lower internal threads 108 (FIG. 10), which engage the external threads 110, is provided at the upper entrance of the spout 102. As seen in FIGS. 10 and 12–14, a raisable plastic handle 112 in the form of opposed loops is integrally attached to the cap 106 at opposed portions 112a and is shown in FIGS. 10 and 12 in a on-raised position prior to opening to the spout closure as will be apparent.

Figures 13, 14:
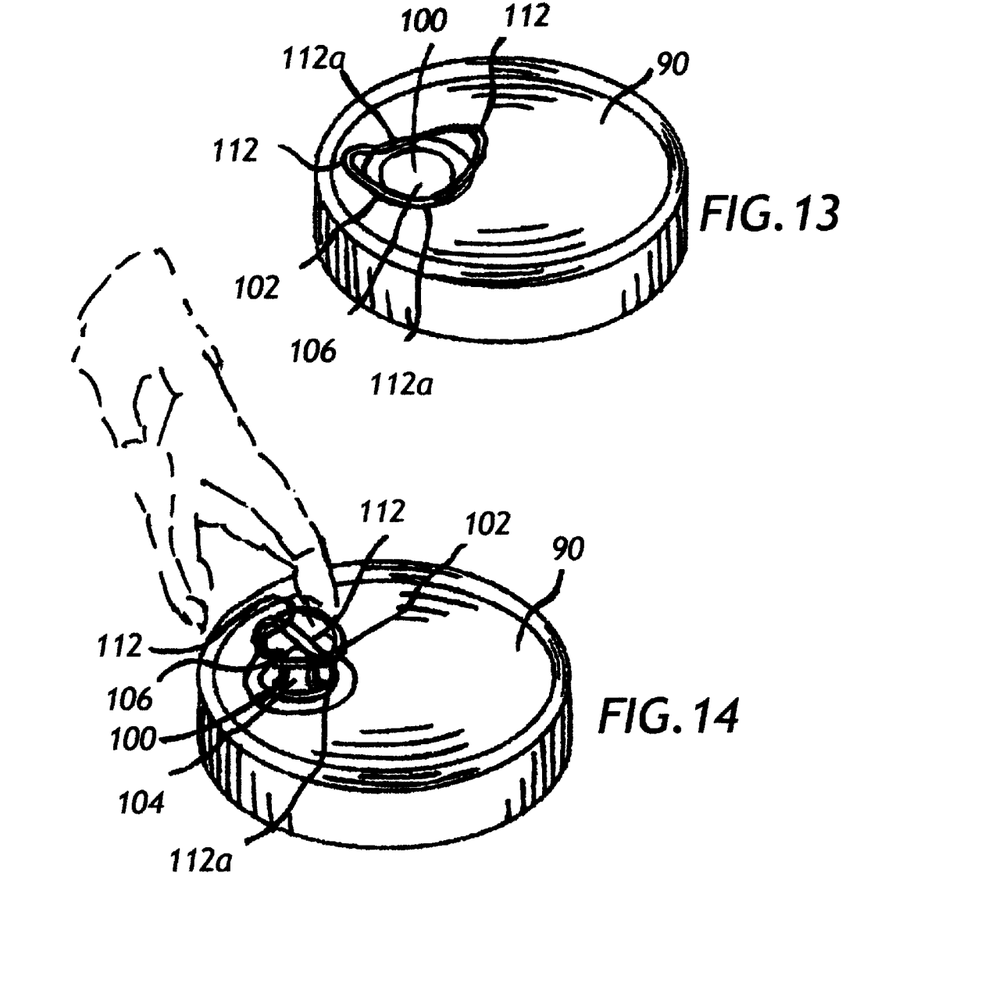
FIG. 13 is a top perspective view of the lid closure after the frangible webs have been broken with the handle being in raised position.
FIG. 14 is a top perspective view of the lid closure with the spout being raised through use of handle.

Referring to FIG. 11, there are shown a plurality of frangible webs 120, such as, for example, four in number, which are fused between the surface 122 of the lid closure 90 and the periphery of the upper lid 106a of the cap 106. The spout and cap assembly 100 may be fused to the lid closure 90 during the molding cycle of the lid, such as during injection molding, in a manner as previously described with reference to FIGS. 1–9. During the process suitable openings are provided in the mold to introduce molten plastic of the lid between the hardened cap 106 and integral with the surface 122, such that the webs 120 are fused to both parts as the molten plastic harden during the molding process. As a result, the cap 106 cannot be removed except by destroying the webs 120 by an implement or the like. Thus, the fused webs 120 of the invention offer tamper proof protection against removal of the contents of the container to which the lid closure 90 is affixed. Further in accordance with the invention, the fused cap 106 is used in conjunction with the spout 102 being also fused to the lid closure in the manner previously described with reference to preceding FIGS. 1–9. Thus, the fused tamper proof cap 105 of FIGS. 10–14 can be formed at the same time as a fused spout to create a fused spout/cap assembly and to eliminate an extra manufacturing step. The frangible webs 120 can also be used with spout assemblies situated at any other pour opening in a container which is not on the lid closure. As seen in FIGS. 12–14, the spout 102 can be raised after the removal of the webs 120 by grasping the two opposed segments 112a of the lid handle 112.

Figure 15:
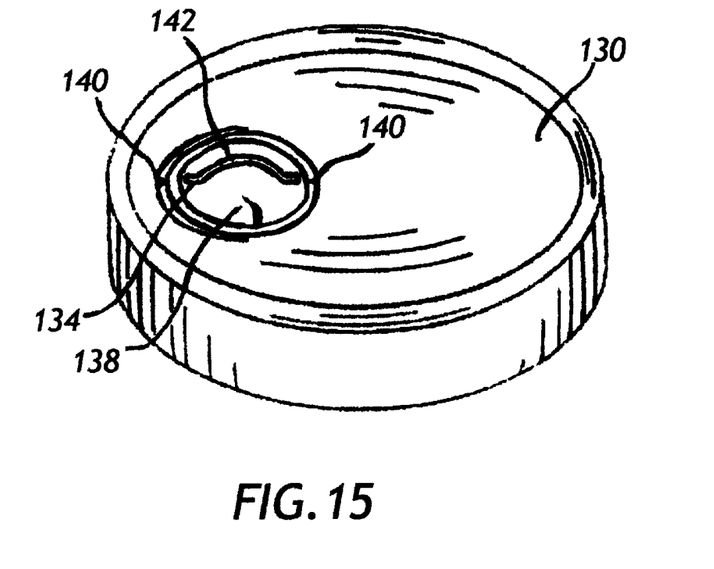
FIG. 15 is a top perspective view of the cap for the pour spout having a modified handle.
Figure 16:
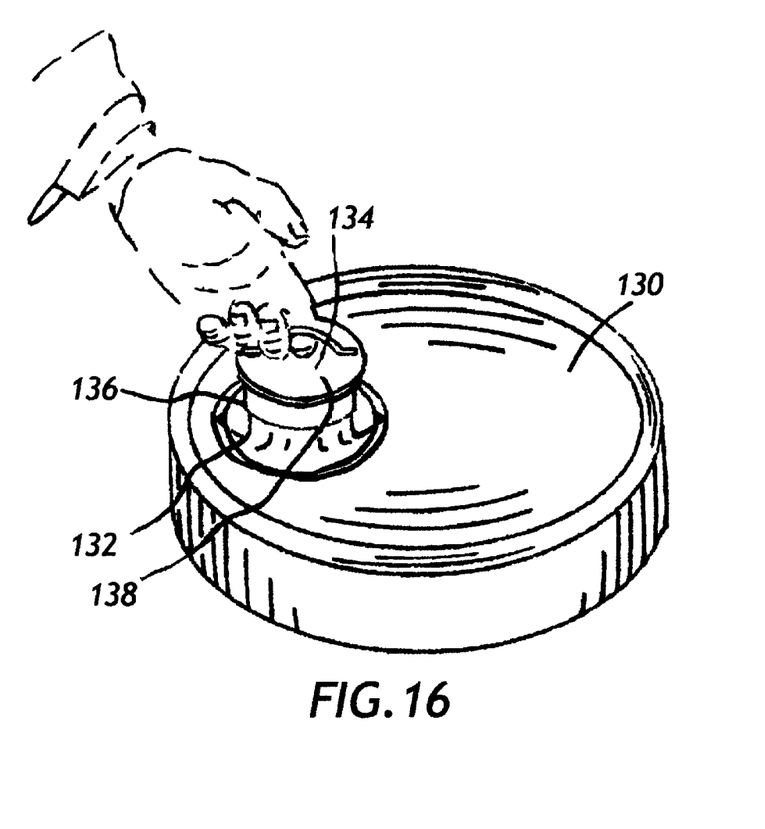
FIG. 16 is a top perspective view showing the pour spout cap shown in FIG. 15 being lifted.
Figure 17:
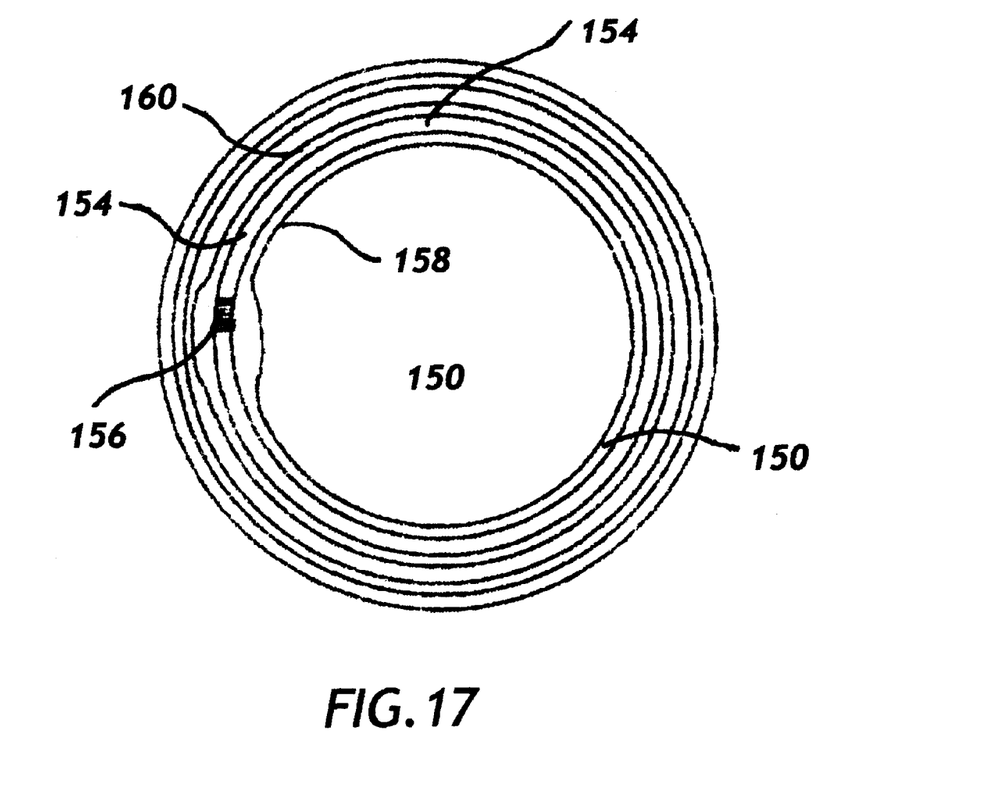
FIG. 17 is a top view of another embodiment of the spout cap of the invention having a fused tear tab.
Figure 18:
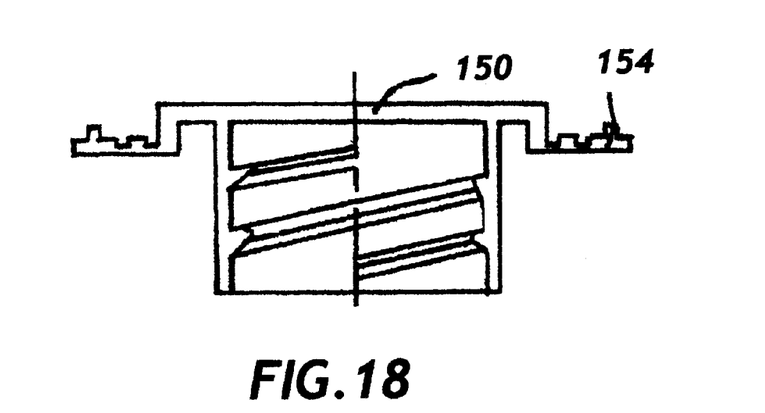
FIG. 18 is a side elevational view of the spout cap of FIG. 17.

Referring to FIGS. 15 and 16, there is illustrated another embodiment of the invention having a typical lid closure 130 being fused to a flexible spout assembly 132 in accordance with the previous described embodiments. The spout assembly 132 includes a cap 134, which may threaded to the spout assembly 132 and having a lower cylindrical base 136 and an upper integral plate portion 138. In FIG. 15, the cap 134 is attached to the lid closure by frangible fused webs 140 of the same type as described with reference to FIGS. 10–14. The bail handle 142 is integrally attached to the lid 134 and may be lifted in the manner shown in FIG. 16. The cap/spout assembly of FIGS. 15 and 16 also forms a tamper proof unit requiring destruction of webs 140 for removal of cap 134.

Figure 19:
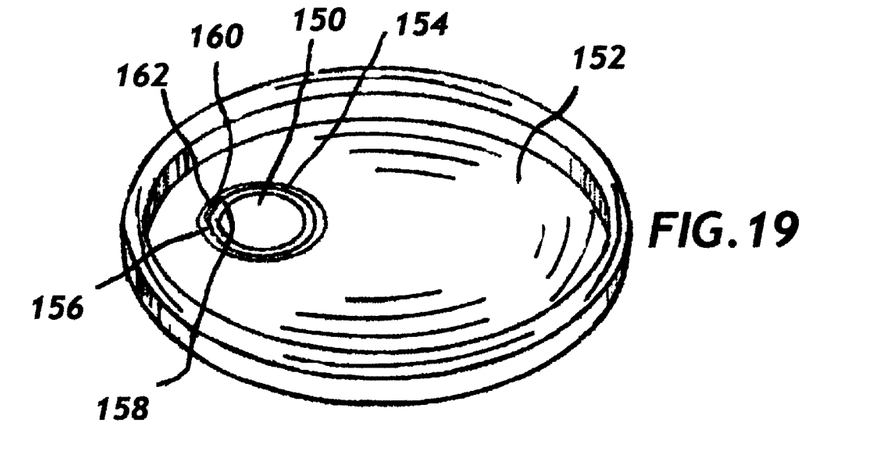
FIG. 19 is a top perspective view of the spout cap of FIG. 17 with the tear strip intact.
Figure 20:
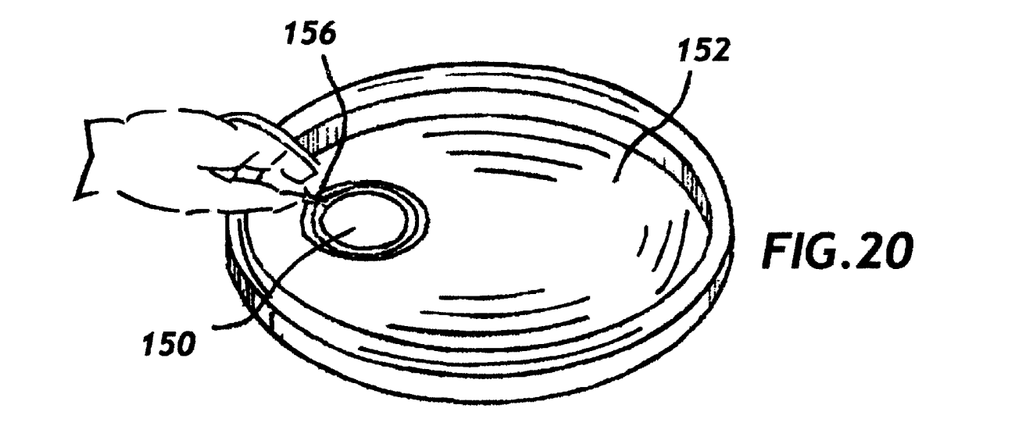
FIG. 20 is a top perspective view of the spout cap of FIG. 17 with the tear strip being initially removed.
Figure 21:
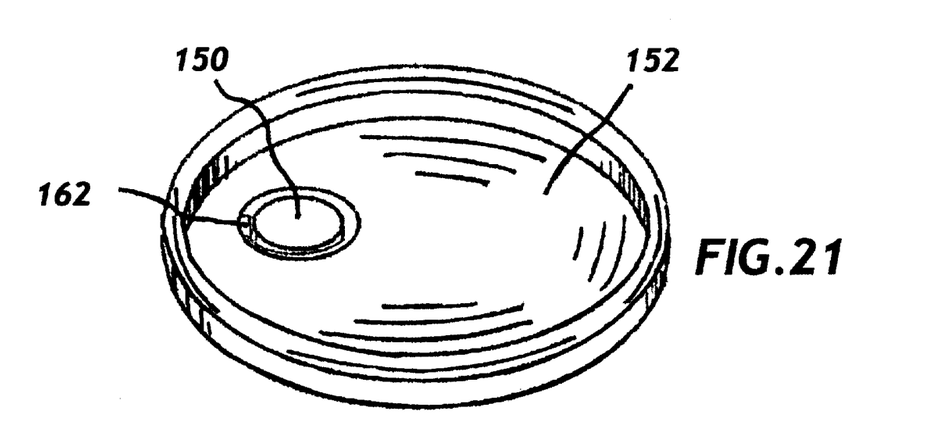
FIG. 21 is a top perspective view of the spout cap of FIG. 17 with the tear strip wholly removed.

In FIGS. 17–21, there is shown a tamper proof cap 150 being fused to the plastic container closure lid 152 by a fused circumferentially extending plastic tear strip or fusion rim 154. The cap 150 is internally threaded by threads 154 for engagement with a pour spout (not shown). The pour spout may be of the type previously described with reference to the preceding embodiment and may also be fused to the lid closure in accordance with the invention. The fusion rim 154 is provided with a raised tear tab 156 to be lifted to allow for removal of the entire fusion rim 154. The removal of the fusing rim 154 permits cap 150 to be lifted from the pour spout. In FIG. 19 the fusion rim 154 is in place and the cap 150 cannot be removed. In FIG. 20, the tear tab 156 is grasped and the entire circumferentially extending fusion rim 154 can then be removed. In FIG. 21, the fusion rim 154 is removed to allow opening of the cap 150. The opposed edges 158 and 160 of the fusion rim are fused to cap 150 and to the lid surface 162 during the molding process as in previously described embodiments by suitable modification of the mold assembly that permits introduction of the molten plastic of lid in the space between the lid surface 162 and the hardened cap 150 during the molding process. The cap 150 may be in threaded engagement with pour spout assembly and also be fitted with a handle (not shown) if desirable.

What is claimed is:

1. A method of molding a first plastic member and simultaneously fusing of said first member a previously molded second plastic member, said method comprising the steps of: using core and cavity sides of a mold to mold said first plastic member, using core and variety side mold inserts which fit into respective ones of said core and cavity of said mold, placing said previously molded second plastic member into one of said mold inserts which are designed to a position said second plastic member relative to said mold when said mold and mold inserts are closed, said inserts being configured to permit molten plastic to flow around a limited portion of said second plastic member to be sued to said first plastic member, closing said mold sides and mold inserts and injecting plastic into said mold, and opening said mold and said inserts to eject said first plastic member to which said limited portion of said previously molded second plastic member has been fused.

2. A method as defined in claim 1 including the step or circulating water through said mold inserts to protect adjacent portion of said second plastic member which are not contacted by molted plastic during the molding operation.

3. A method as defined in claim 1 where said limited portion of said second plastic member comprises as relatively thick portion of said second member.

4. A method ad defined in claim 3 where said second plastic member includes a relatively thin section incapable of withstanding contact with said molted plastic, and said core and cavity side mold inserts being designed to engage against opposite sides of a portion of said thin section adjacent said relatively thick portion to pinch and seal off said thin section and prevent the same from being contacted by said molted plastic during a molding operation.

5. A method as defined in claim 4 where said core and cavity sides of said mold and said core and cavity mold inserts are designed so when said mod side are closed in steel-to-steel contact said mold inserts will pinch against opposite sides of said thin section of said second plastic member with sufficient force to create a seal against flow of molted plastic but whit insufficient force to damage said thin section of said second plastic member.

6. A method as defined in claim 1 where said first plastic member is a plastic lid for a bucket and said second plastic member comprise a pour spout for said lid.

7. A method of molding a first plastic member and simultaneously fusing to said first member a previously molded second plastic member, said method comprising steps of:

using core and cavity sides of a mold to mold said first plastic member, using core and cavity sides mold inserts with fit into respective ones of said core and cavity sides of said mold, placing said previously molded second plastic member into one of said mold inserts, said inserts being designed when closed to position second plastic member relative to said mold and are configured to permit molted plastic to flow around relatively thick portion of said second plastic member to be fused to said first plastic member while protecting other portions of said second plastic member from being contacted by molted plastic, closing said mold sides and mold inserts and injecting plastic into said mold, and opening said mold and said inserts to eject said first plastic member to which said relatively thick portion of said previously molded second plastic member has been fused.

8. A method of molding a plastic lid, and simultaneously fusing to said lid a previously mold plastic pour spout, said method comprising the steps of:

using core and cavity sides of a mold to mold said plastic lid, using core and cavity side mold inserts which fit into respective ones of said core and cavity sides of said mold, placing said previously molded pour spout into one of said mold inserts to position said pour spout relative to said mold when said mold and mold inserts are closed, said inserts being configured to permit molten plastic to flow around a relatively thick base portion of said pour spout to be fused to a lid wall while protecting other portions of said pour spout from being contacted by molten plastic, closing said mold sides and mold inserts and injection plastic into said mold, and opening said mold and said inserts to eject said plastic lid to which said relatively thick base portion of said pour spout is fused.

9. A method as defined in claim 8 where said relatively thick portion of said pour spout includes a relatively thick annular rim.

10. A method a defined in claim 9 where said relatively thick portion of said pour spout also includes an annular flange.

11. A method as defined in claim 8 where said other portions of said pour spout include a thin, flexible wall which permits of said pour spout to be moved between an collapsed position when not in use and extended position for pouring.

12. A method as defined in claim 8 where said core and cavity sides of said mold and said core an cavity mod inserts are designed so when said mold sides are closed in steel-to-steel contact, said mold inserts will pinch against opposite sides of said other portions of said pour spout adjacent said relatively thick base portion with sufficient force to create a seal against flow of molted plastic but with insufficient force to damage said other portions of said pour spout.

* * * * *